June 15, 1948.　　　F. M. MINER, JR　　　2,443,321
MOIST PACK HEATER
Filed July 28, 1944
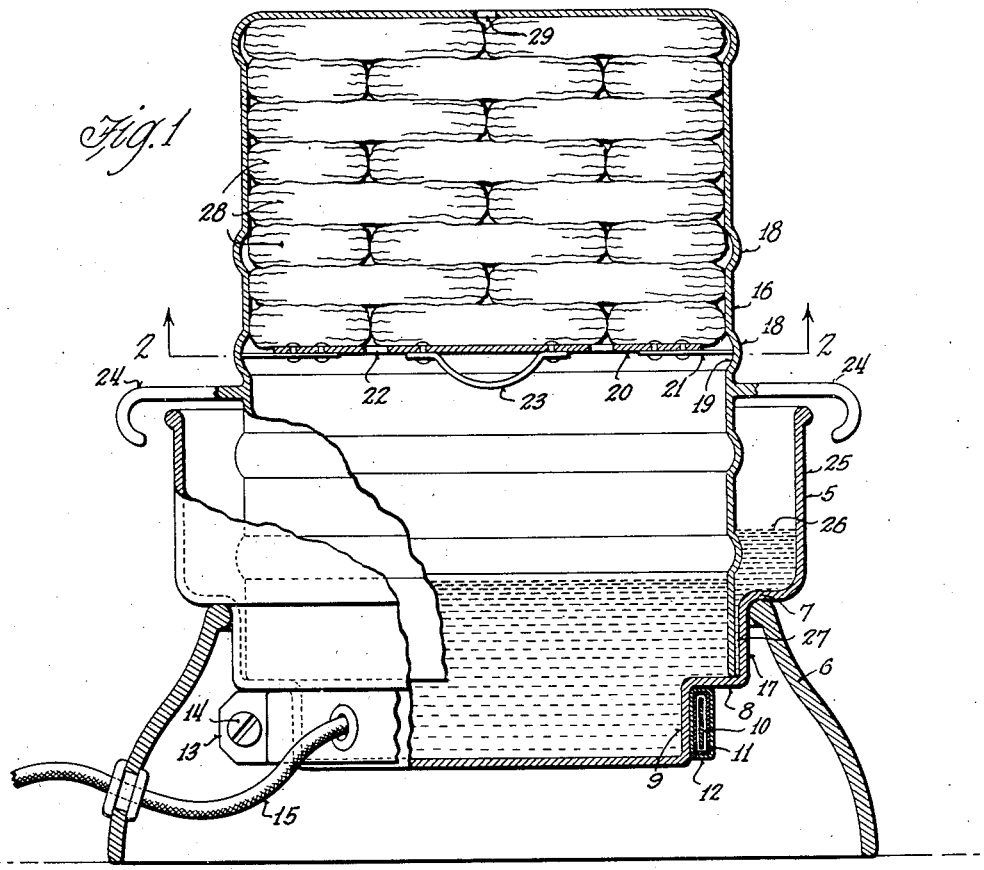
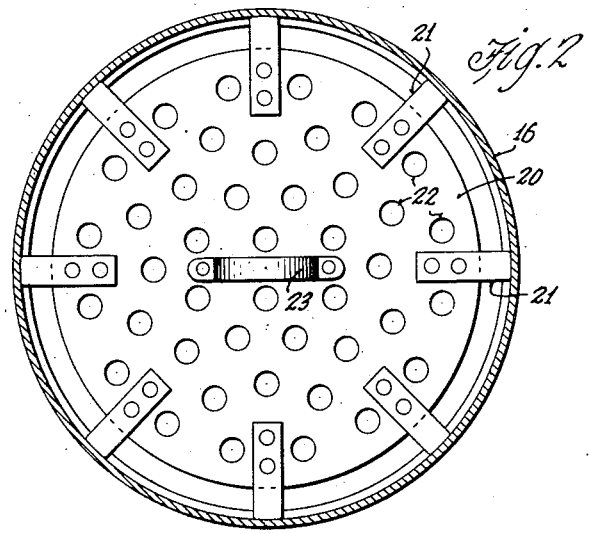
INVENTOR.
Frederick M. Miner, Jr.
BY David G. Fox
ATTORNEY.

Patented June 15, 1948

2,443,321

UNITED STATES PATENT OFFICE 2,443,321

MOIST PACK HEATER

Frederick Mason Miner, Jr., Madison, Wis., assignor to Renim, Inc., Madison, Wis., a corporation of Wisconsin Application July 28, 1944, Serial No. 547,088

3 Claims. (Cl. 68—5)

The invention relates to a moist pack heater and more particularly to a heater for bringing hot fomentations to an appropriate condition for therapeutic use.

An object of the invention is to provide a heater which will bring a considerable number of packs simultaneously to appropriate moisture content and temperature and which includes a removable container for the packs associated in liquid sealed relation with a water containing receptacle and base member which is provided with a heater for generating the steam which is compelled by the water seal to escape upwardly through the packs.

A further object of the invention is to provide a heater in which the parts are so constructed and arranged that the steam as formed will be directed upwardly through the material to be treated toward a controlled or restricted outlet at the top.

The invention further consists in the several features hereinafter set forth and more particularly defined by claims at the conclusion hereof.

In the drawings:

Fig. 1 is a view generally in vertical section, parts being shown in full of a device embodying the invention;

Fig. 2 is a detailed vertical sectional view taken on the line 2—2 of Fig. 1.

Referring to the drawings, the numeral 5 designates a metal receptacle which may be formed integral with or mounted in an annular conical metal support 6. For sanitary reasons the parts 5 and 6 are preferably made separate and the top edge of the support engages an annular ledge 7 formed on the receptacle. The receptacle 5 also has another annular ledge 8 formed therein adjacent the cup-shaped bottom 9.

A heating element of any suitable construction is associated with the bottom 9. As herein shown this element includes an electrically heated resistance element 10 enclosed in a sheath 11 of mica or other suitable insulating material which is enclosed in a sheet metal sheath 12 of split ring construction whose ears 13 are secured together by a bolt 14 which also serves to clamp the element about the wall of the bottom 9. The heating element is supplied from any suitable source of electrical energy from a supply conductor 15 that extends through a rubber bushing mounted in an opening in the wall of the support 6.

A metal container 16 of cylindrical form having a vent 29 centrally disposed in its extreme upper portion is adapted to rest in inverted position upon the ledge 8 and is of a diameter slightly less than the diameter of the wall portion 17 of the receptacle connecting the ledges 7 and 8. At spaced intervals along its length this container is provided with annular bulges 18 forming annular recesses 19 adapted to releasably hold a pad retainer plate 20 in different vertical positions relative to the container, this plate having a series of radially disposed resilient metal fingers 21 engageable in said recesses. The plate 20 is provided with a plurality of perforations 22 to allow passage of steam therethrough and has a handle 23 secured to its lower side. The container 16 has diametrically disposed handle portions 24 secured thereto for positioning in or removing the container from the receptacle 5.

The upper wall portion 25 of the receptacle is such as to provide a water sealing space 26 of sufficient height that the column of water therein exerts enough pressure on the sealing area 27 to prevent the escape of steam from the interior of the container 16 and the receptacle when the water in said receptacle is brought to boiling by the action of the heating element. This is further aided by the fact that the bottom portion 9 which is the most highly heated zone of the receptacle is spaced inwardly from the wall of the container so that steam bubbles rising upwardly will not escape through the water seal.

In use the cloth packs 28 to be treated are packed in layers in the container 16 as shown, and the cover plate 20 then moved into place to hold the packs from falling out when the container is inverted and has its open end set into the receptacle 5 which has been filled with water to a level sufficient to provide a water seal 27 and 26 between the receptacle and container. The heater is then turned on and the steam generated rises upwardly in the container 5, permeating the packs progressively and bringing them to an appropriate condition as to temperature and moisture. By reason of the upward permeation of the steam passing toward the vent 29, a progressively rising roughly horizontal condensation zone which appears to inhibit channeling is formed. In any case as soon as steam escapes from the vent 29 the packs 25 will all be found to be uniformly heated and of an ideal moisture content without any local pockets of unheated packs. Furthermore, as soon as escape of steam from the vent 29 is noted, the same can be relied upon as a signal that the packs are ready for immediate use without need for wringing or any other subsequent treatment. Fig. 1 shows the height of the water in the space 26 after boiling has started.

As the device is readily portable, the packs may be prepared wherever a patient is to be treated.

I desire it to be understood that this invention is not to be limited to any particular form or arrangement of parts except in so far as such limitations are included in the claims.

What I claim as my invention is:

1. In a device of the character described, the combination of a water containing receptacle, a container having spaced recesses, said container being mounted in said receptacle in inverted position and having a vent opening in its upper end surrounded by wall surfaces of said container, a pack holder in said container adjustably engageable with any of said container recesses and adapted to press a consolidated mass of packs to be heated against said wall surfaces surrounding said vent, the lower end portion of said container being spaced from the walls of said water containing receptacle to form a water seal, and means for heating the water in the bottom portion of said receptacle inwardly of the area forming said seal.

2. In a device of the character described, the combination of a water containing receptacle having a bottom portion, a ledge, and a portion of larger diameter above said ledge; a pack carrying container comprising side walls and an end wall secured thereto, said end wall having vent means therein surrounded by wall surfaces, said container being mounted in said receptacle in inverted position; means adapted to engage said side walls and to press a consolidated mass of packs to be heated against the end wall surfaces surrounding said vent; the lower end portion of the side walls of said inverted container resting on said ledge and spaced from the part of said container of larger diameter to provide a water seal; and means for applying heat to the water in the bottom portion of said receptacle.

3. In an apparatus adapted to heat and moisten fibrous packs of the nature employed for therapeutic purposes the combination comprising a pack enclosing chamber having side walls and an end wall secured thereto, said end wall having vent means therein; means adapted to press a consolidated mass of packs to be heated against said end wall; and means adapted to supply steam to said chamber at limited low pressure on the side of said pack pressing means opposite said end wall so that escaping steam in traveling to said vent is compelled to traverse a mass of packs contained in said chamber.

FREDERICK MASON MINER, Jr.

REFERENCES CITED

The following references are of record in the file of this patent:

UNITED STATES PATENTS

| Number | Name | Date |
|---|---|---|
| 348,821 | Becker | Sept. 7, 1886 |
| 756,242 | Kuhn | Apr. 5, 1904 |
| 1,326,443 | Cutting | Dec. 30, 1919 |
| 1,344,326 | Williams | June 22, 1920 |
| 1,975,082 | Bucy | Oct. 2, 1934 |
| 2,068,692 | Myron | June 26, 1937 |
| 2,157,975 | Wilson | May 9, 1939 |
| 2,173,733 | Saybert | Sept. 19, 1939 |
| 2,381,974 | Emerson | Aug. 14, 1945 |

FOREIGN PATENTS

| Number | Country | Date |
|---|---|---|
| 38,853 | Sweden | July 26, 1912 |
| 86,924 | Austria | June 15, 1921 |